United States Patent [19]
Horiuchi

[11] Patent Number: 5,794,582
[45] Date of Patent: *Aug. 18, 1998

[54] CONNECTING STRUCTURE OF PISTON AND CONNECTING ROD

[75] Inventor: Shigeaki Horiuchi, Kanagawa, Japan

[73] Assignee: Isuzu Motors Ltd., Tokyo, Japan

[*] Notice: The term of this patent shall not extend beyond the expiration date of Pat. No. 5,413,074.

[21] Appl. No.: 862,877

[22] Filed: May 23, 1997

Related U.S. Application Data

[63] Continuation of PCT/JP96/02840 Sep. 26, 1996, abandoned.

[51] Int. Cl.$^6$ ............................................. F16J 1/14
[52] U.S. Cl. ........................... 123/197.2; 123/193.6; 92/216
[58] Field of Search ............... 123/197.2, 197.3, 123/197.4, 193.6; 92/216, 187, 176, 157, 159, 160

[56] References Cited

U.S. PATENT DOCUMENTS

| | | | |
|---|---|---|---|
| 2,742,883 | 4/1956 | Smith | 123/41.38 |
| 3,027,207 | 3/1962 | Meurer | 123/197.2 |
| 3,056,638 | 10/1962 | Hovde | 123/197.2 |
| 4,031,868 | 6/1977 | Karaba et al. | 123/78 B |
| 4,794,848 | 1/1989 | Melchior | 92/159 |
| 5,086,736 | 2/1992 | Wiemann | 123/193.6 |
| 5,115,725 | 5/1992 | Horiuchi | 92/157 |
| 5,179,916 | 1/1993 | Schonfeld | 123/193.6 |
| 5,307,732 | 5/1994 | Berlinger | 123/193.6 |
| 5,413,074 | 5/1995 | Horiuchi | 123/197.2 |

*Primary Examiner*—David A. Okonsky
*Attorney, Agent, or Firm*—John E. Toupal; Harold G. Jarcho

[57] ABSTRACT

An internal combustion engine includes a piston having a crown portion with a bottom surface and a skirt projecting therefrom to form a cavity, and a connecting rod having at one end a semicylindrical yoke portion with an upwardly directed semicylindrical concave surface and downwardly directed semicylindrical convex surfaces. A guide member is slidably retained between the bottom surface and the concave surface, and an annular member projecting into and fixed to the skirt defines spaced apart semicylindrical concave surfaces each engaging portions of the convex surfaces.

20 Claims, 7 Drawing Sheets

CONNECTING STRUCTURE OF PISTON AND CONNECTING ROD

This is a continuation of International Application No. PCT/JP96/02840 with an international filing date of Sep. 26, 1996, now abandoned.

BACKGROUND OF THE INVENTION

The present invention relates generally to a connecting structure between a piston and a connecting rod in an internal combustion engine and, more particularly, to such connecting structure which is light in weight, has a connecting rod oscillating center close to a piston crown, and reduces piston knock.

According to a piston rod connecting structure disclosed in Japanese Patent Application Laid-Open No. 249673/1992, provides an oscillating center of the connecting rod considerably closer to a piston crown surface than prior art pin connectors. Consequently, if an arm of a crank shaft and a connecting rod are lengthened by that amount, the displacement of the cylinder increases without changing a dimension of the cylinder block to thereby increase an engine output. In the aforementioned connecting structure, an end of a connecting rod in the form of a bowl is slidably supported between a hemispherical oscillation guide member and an annular member having a hemispherical depressed surface. The annular member is supported on a holding tube screwed into the piston's skirt portion. Since clearance of a sliding portion of the connecting rod is altered by the position of the holding tube assembly and adjustments are time consuming.

An improved connecting structure is disclosed in the specification of Japanese Patent Application Laid-Open No. 12,228/1995 (Patent Application No. 176,003/1993) and U.S. Pat. No. 5,413,074. According to that structure, a small end of a connecting rod is formed integrally with a pair of arms, which are semicircular in section and project in a direction of a crank shaft. A semicircular columnar oscillating guide member is engaged with upper concave surfaces of the arms, and a pair of tubular depressed portions formed in an upper end wall of an annular member are engaged with lower convex surfaces of the arms. These components are fitted into an inverted cup-shaped inner sleeve which is positioned in a skirt portion of the piston body. A top wall of the inner sleeve is placed in contact with the lower surface of the piston crown, and a lower end of the annular member is supported on a projecting portion of the skirt portion. According to the aforementioned connecting structure, clearance of the sliding portion of the connecting rod is not changed during assembly but is determined merely by selecting an oscillating guide member having suitable dimensions.

However, in the aforementioned improved connecting structure, there are many superposed surfaces for which processing or machining accuracy is required. Thus, management or maintenance of desired clearance of the sliding portion of the connecting rod is difficult. That is, the clearance of the sliding portion of the connecting rod is determined by eight superposed surfaces including the lower surface of the piston crown portion and the upper surface of the inner sleeve, the lower surface of the top wall of the inner sleeve and the upper surface of the oscillating guide member, the surface of an intermediate shoulder of the inner sleeve and the upper end surface of the annular member and the surface of the lower end surface of the annular member and a projecting piece of the skirt portion. Accordingly, maintenance of the machining accuracy is difficult, and machining expenses increase. Even if a combination of parts is selected according to a machining tolerance of parts, the cumulated tolerance of parts is so large that productivity is low. In addition, the clearance of the sliding portion of the connecting rod can change due to thermal expansion of the top wall of the inner sleeve in contact with the combustion chamber.

Further, in the aforementioned connecting structure, the center of gravity of the piston assembly is at a level lower than the center of oscillation of the connecting rod relative to the piston. Therefore, the piston's skirt portion of low rigidity impinges upon the cylinder. That generates a fine slippage between the upper surface of the projecting piece of the piston's skirt portion that supports the annular member and the lower end surface thereof. Resultant abrasion increases the clearance between the parts until the top surface of the piston can possibly abut against the cylinder head.

The object of the present invention, therefore, is to provide a connecting structure between a piston and a connecting rod in which the number of superposed surfaces are reduced, and maintenance of a clearance of a sliding portion of a connecting rod is facilitated.

It is a further object of the present invention to provide a connecting structure between a piston and a connecting rod in which an axial length of an annular member is shortened, and a center of gravity of a piston is moved close to a center of oscillation of a connecting rod whereby a piston's skirt portion is prevented from impinging upon a cylinder due to the goose-neck or swing motion of the piston, and abrasion between the annular member and a projecting piece of the skirt portion is prevented.

SUMMARY OF THE INVENTION

According to the present invention, the connecting structure between a piston and a connecting rod includes an oscillation guide member which directly engages a lower surface of a piston crown (the bottom wall of a combustion chamber) so as to reduce the number of superposed surfaces and reduce cumulated tolerance.

According to certain features of the present invention, a lower semicylindrical half portion of a columnar-shaped oscillation guide member engages an upper semicylindrical, concave surface formed by a pair of arms on a small end of a connecting rod, and an upper planar surface portion of the oscillation guide member engages a lower surface of a piston crown. In this arrangement, the superposed surfaces anticipated in a clearance of a sliding portion of the connecting rod is reduced to four and as a result cumulated tolerance of parts is reduced, machining expense is reduced, and productivity is enhanced.

According to another feature of the invention, lubricating oil is supplied via an oil passage extending through the oscillation guide member to the superposed upper surface of the guide member and the lower surface of the piston crown. Resultant cooling prevents the clearance of the sliding portion of the connecting rod from being changed due to thermal expansion.

According to yet another feature of the invention, an inwardly projecting portion of a piston skirt portion supports the annular member and is located upwardly away from a lower end where deformation of the skirt portion is large. Large notches are provided in front and rear wall portions of the skirt to prevent interference with a balance weight of a crank shaft. An axial dimension (height) of the annular member is shortened so that the lower half portion of a piston assembly is reduced in weight and a center of gravity of the piston moves closer to a center of oscillation of the connecting rod.

According to yet another feature of the invention, a roller bearing is provided between the semicylindrical lower convex surface of the guide member and the concave upper surface of the arms on the connecting rod. The roller bearings reduce friction between the connecting rod and guide member.

DESCRIPTION OF THE DRAWINGS

These and other objects and features of the invention will become more apparent upon a perusal of the following description taken in conjunction with the accompanying drawings wherein:

In FIGS. 1, 2 and 5–10, the hatching of the crown portion of the piston and the skirt portion has been omitted.

DESCRIPTION OF THE PREFERRED EMBODIMENTS

Figure 1:
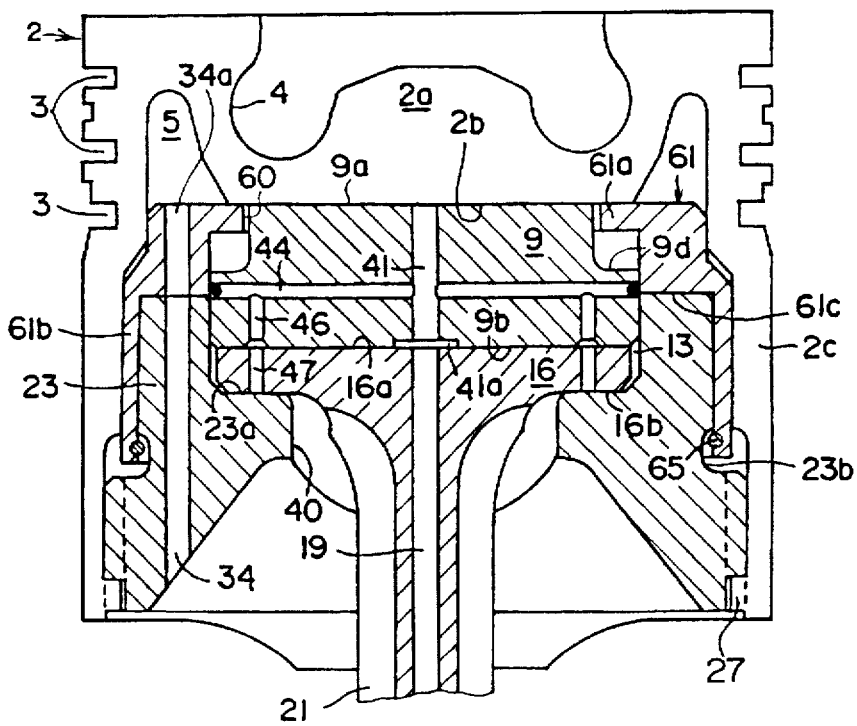
FIG. 1 is a front sectional view showing a connecting structure between a piston and a connecting rod according to a first embodiment of the present invention.
Figure 2:
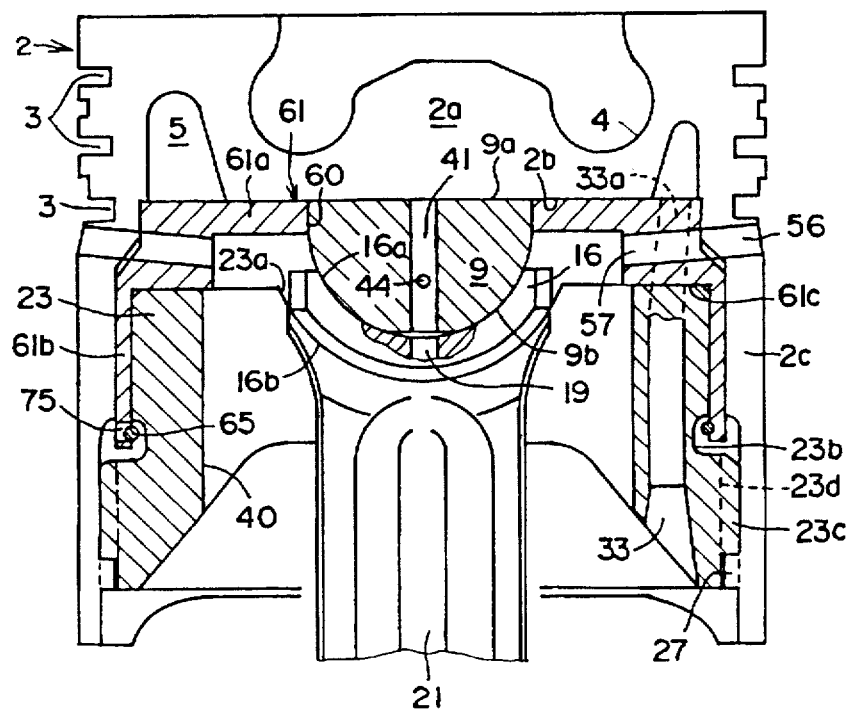
FIG. 2 is a side sectional view showing the connecting structure of FIG. 1.

As shown in FIGS. 1 and 2, a piston 2 includes a crown portion 2a defining a combustion chamber 4 in the form of an asymmetrical depression. Formed in the upper half portion on the outer surface of the crown portion 2a are a plurality of ring grooves 3. The central portion of the crown portion 2a is downwardly protruded so as to encircle a bottom of the combustion chamber 4 and to provide a planar lower surface 2b. Formed in the lower surface 2b of the crown portion 2a is an annular cooling oil chamber 5 that surrounds the combustion chamber 4. A skirt portion 2c of the piston 2 projects downwardly from a bottom surface 2b of the crown portion 2a and forms a cavity.

A semicylindrical yoke portion at a small end of an integrally formed connecting rod 21 includes arms 16 forming an upwardly directed semicylindrical concave surface 16a and downwardly directed semicylindrical convex surfaces 16b. The arms 16 extend in an axial direction of a crank shaft (not shown). Slidably retaining the pair of arms 16 in an oscillatory manner is an annular member 23 received within an inverted cup-shaped inner sleeve 61. A planar upper surface 9a of a semicylindrical, columnar guide member 9 extends through a rectangular opening 60 in an upper wall 61a of the inner sleeve 61 and engaged with lower surface 2b of the piston crown 2a. A lower cylindrical surface 9b of the guide member 9 is engaged with the upper concave surfaces 16a of the arms 16.

An upper end of the annular member 23 engages an intermediate annular shoulder 61c formed on the inner sleeve 61. An intermediate portion of the annular member 23 is held by a retainer ring 65 so as not to slip out of the lower end of the inner sleeve 61. To this end, the retainer ring 65 is resiliently engaged within an annular groove provided in a lower inner end of a peripheral wall 61b of the inner sleeve 61. The retainer ring 65 also engages a deep and wide annular groove 23b provided in an outer surface portion of the annular member 23. For disengaging the retainer ring 65, the peripheral wall 61b of the inner sleeve 61 also is penetrated by a plurality of tool accommodating slits 75 as disclosed in U.S. Pat. No. 5,413,074.

Figure 3:
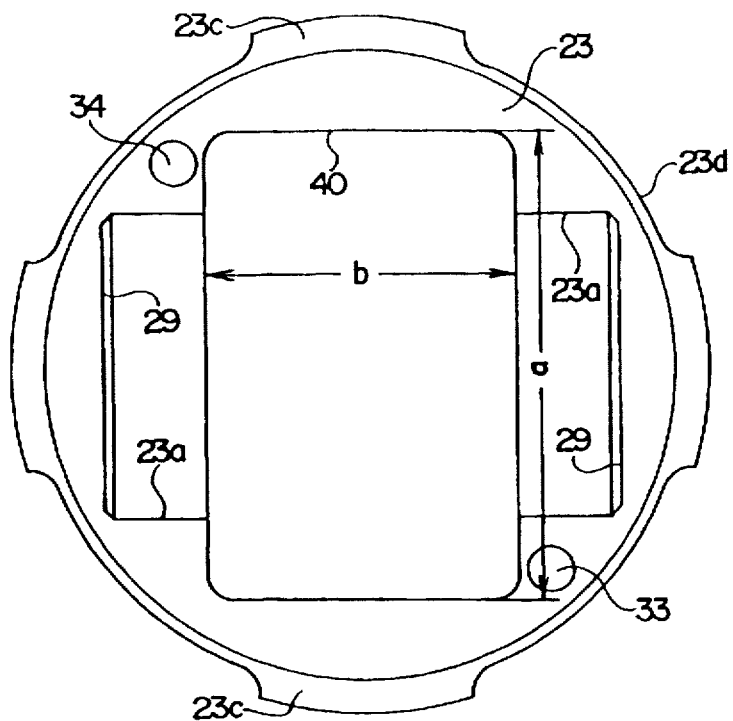
FIG. 3 is a plan view showing an annular member in the connecting structure of FIG. 1.

As shown in FIG. 3, the annular member 23 is provided, in an upper end wall thereof, with a rectangular opening 40 which extends perpendicular to the crank shaft. A pair of concave semicylindrical surfaces 23a are formed on both sides in the upper end wall of the cylindrical member 23 and straddle the opening 40. The lower convex surfaces 16b of the arms 16 are slidably supported on the semicylindrical surfaces 23a of the member 23. Formed in the member 23 are sidewalls 29, each intersecting one of the semicylindrical surfaces 23a and separated by a distance greater than a given distance between outer edges of the arms 16. Resultant clearances 13 allow relative sliding movement of the connecting rod 21 with respect to the piston 2 in a direction of a crank shaft and absorb any error in a spacing arrangement between a plurality of cylinders disposed on a cylinder block (not shown) and a plurality of pistons 2 connected to a crank shaft (not shown) through connecting rods 21.

A maximum length dimension (a) of the rectangular opening 40 is longer than the given distance separating the outer overall edges of the pair of arms 16, and a width dimension (b) of the opening 40, establishes between the surfaces 23a, a predetermined distance that is less than the given distance. To mount the pair of arms 16 on the semicylindrical surfaces 23a, the pair of arms 16 are directed lengthwise through the opening 40. Subsequently, the connecting rod 21 is rotated 90° (degrees) to move the arms 16 into engagement with the surfaces 23a.

As shown in FIG. 1, the cup-shaped inner sleeve 61 is fitted in the cavity formed by the skirt portion 2c after the small end portion of the connecting rod 21 has been assembled thereinto. A bottom wall plate portion 61a of the inner sleeve 61 is brought into contact with the bottom surface 2b of the crown portion 2a, and the annular cylindrical member 23 is held between the intermediate shoulder portion 61c of the inner sleeve 61 and a plurality of longitudinal rib projections 27 formed on the skirt portion 2c. The ribs 27 are arranged on the inner surface at the lower end of the skirt portion 2c in circumferentially equally spaced relation and protrude diametrically inwardly.

As shown in FIGS. 1 and 2, an outer diameter of a lower half portion of the annular member 23 is larger than that of an upper half portion thereof. Formed in an outer surface of the member 23 are longitudinally directed and alternating grooves 23d and projections 23c equal in number to the ribs 27. The width of each groove 23d is wider than that of each rib 27. During assembly of the annular member 23, the grooves 23d are aligned with the ribs 27, and the member 23 is inserted into the skirt portion 2c. Then the member 23 is rotated a predetermined amount to position the projections 23a over the ribs 27 of the skirt portion 2c.

The cooling oil chamber 5 in the crown portion 2a of the piston 2 is partially defined by the bottom wall 61a of the inner sleeve 61. During the operation of the engine, oil discharged from an oil jet (not shown) enters the annular cooling oil chamber 5 via an inlet oil passage 33 of the member 23 and an aligned oil passage 33a in the inner sleeve 61. The oil flows through the chamber 5 and returns to a crank chamber (not shown) via a diametrically opposite outlet oil passage 34a in the inner sleeve 61 and an aligned outlet oil passage 34 in the member 23 as shown in FIG. 2. Proper positions of the respective oil passages 33 and 34 in the member 23 are shown in FIGS. 1 and 2. The piston 2 is provided under the ring grooves 3 with an oil passage 56 extending through the skirt 2c and communicating with an internal portion of the inner sleeve 61 via an oil passage 57 therein.

As shown in FIG. 1, lubricating oil from an oil pump (not shown) lubricates interfaces between the lower surface 9b of the guide member 9 and the upper surfaces 16a of the arms 16 in addition to interfaces between the lower surface 9a of the guide member 9 and the lower surface 2b of the piston crown 2a via an internal oil passage 19 in the connecting rod 21, a wide inlet hole 41a in the guide member 9, a vertical oil passage 41, oil passages 44 extending radially from opposite sides of the oil passage 41, and an oil passage 46 which terminates at the lower surface 9b. Furthermore, lubrication of an interface between the lower surfaces 16b of the arms 16 and the semicylindrical concave surface 23a of the member 23 is provided via oil passages 47 formed in the pair of arms 16 and communicating with the passages 46.

According to the present embodiment, the superposed surfaces participating in the clearance of the sliding portions of the arms 16 of the connecting rod 21 are less than those of prior art. Therefore, machining expense is reduced, productivity is enhanced, the cumulative tolerance of parts is small and reliability is enhanced. In addition, the guide member 9, the connecting rod 21 and the annular member 23 are mounted in the inner sleeve 61 to thereby simplify assembly.

Figure 5:
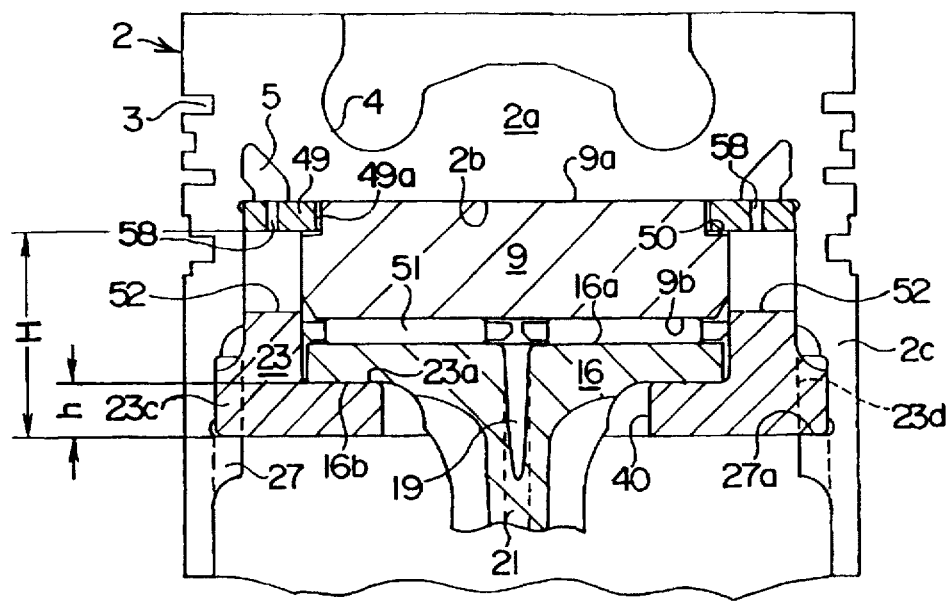
FIG. 5 is a front sectional view of a connecting structure between a piston and a connecting rod according to a second embodiment of the present invention.
Figure 6:
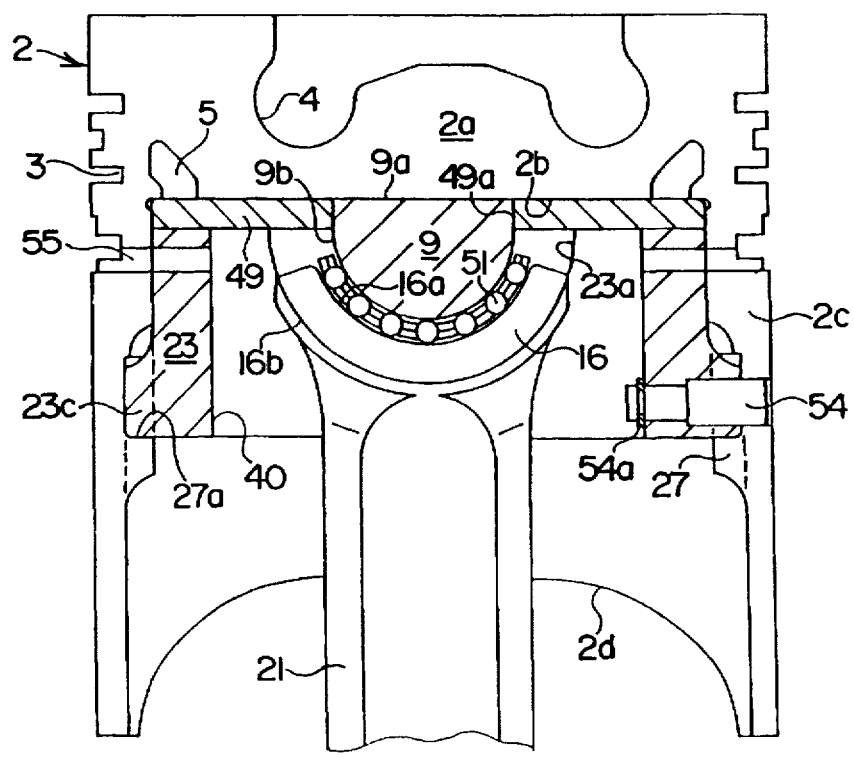
FIG. 6 is a side sectional view showing the connecting structure of FIG. 5.

In the embodiments shown in FIGS. 5 and 6, the inner sleeve 61 is replaced by a top wall plate 49 placed in contact with the lower surface 2b of the piston crown 2a to close the annular cooling oil chamber 5. During the operation of the engine, lubricating oil is injected out of an oil jet (not shown) and supplied to the oil chamber 5 via the inlet oil passage of the annular member 23 and an oil passage (not shown) in the top wall plate 49. Lubricating oil from the cooling oil chamber 5 drops into semicircular depressions 52 formed in opposed peripheral wall portions of the annular cavity 23, via a pair of oil orifices 58 provided in the top wall plate 49. The top width of the semicircular columnar guide member 9 is shortened to form an annular shoulder 50 supporting the plate 49 which has a central opening 49a through which projects the upper surface 9a of the guide member 9 into contact with the lower surface 2b of the piston crown 2a. Disposed between the lower surface 9b of the guide member 9 the semicylindrical concave portions of the arms 16 of the connecting rod 21 are a pair of left and right roller bearings 51.

The lower surface of the annular member 23 is supported on an upper surface 27a of an inward projection 27 on an upper portion of the skirt portion 2c. Notches 2d, which are as large as possible, are provided in left and right peripheral edges of the skirt portion 2c so as not to interfere with a balance weight (not shown) of the crank shaft. An axial dimension H of the annular member 23 is shortened and the notches 2d are provided in the skirt portion 2c to reduce the weight of the lower half portion of the piston assembly. Thus, the center of gravity of the piston body 2 is moved near to the center of oscillation of the connecting rod 21. The axial dimension H of the annular member 23 is determined by the radius of curvature r of the lower surface 9b of the guide member 9, a width dimension h of the lower portion of the cylindrical depressed portions 23a supporting the small end of the connecting rod 21 and the desired strength of the annular member 23. A stop pin 54 extending through the skirt portion 2c of the piston body 2 and the annular member 23 is provided to obstruct rotation of the piston body 2 with respect to the connecting rod 21. Secured to an inner end of the stop pin is a retainer ring 54a.

According to the present embodiment, the top wall plate 49 functions to close the cooling oil chamber 5, establish the position of the oscillation guide member 9, and simplify the geometry of parts. Furthermore, since no inner sleeve is provided, the wall thickness of the skirt portion 2c can be larger to enhance rigidity.

Figure 7:
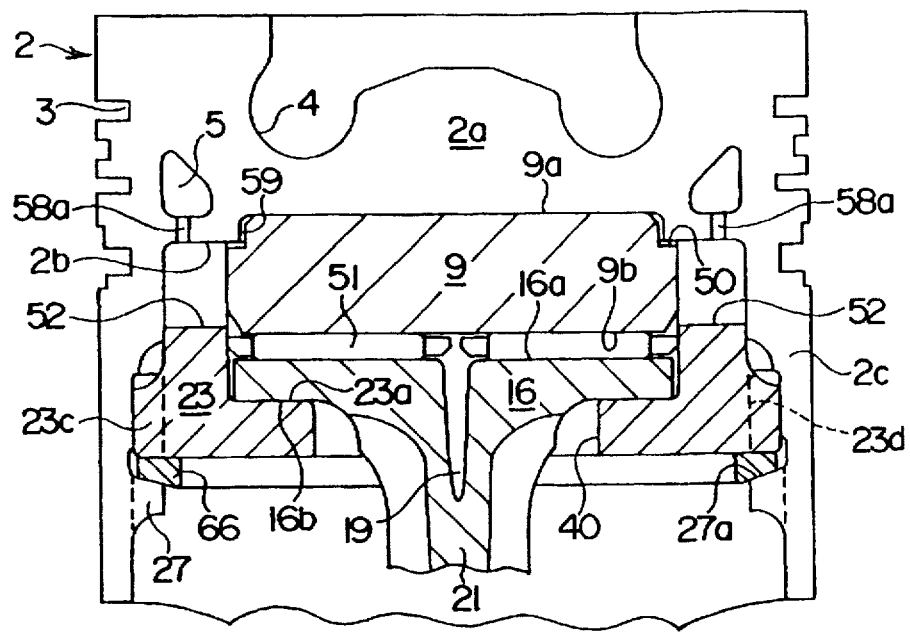
FIG. 7 is a front sectional view of a connecting structure between a piston and a connecting rod according to a third embodiment of the present invention.
Figure 8:
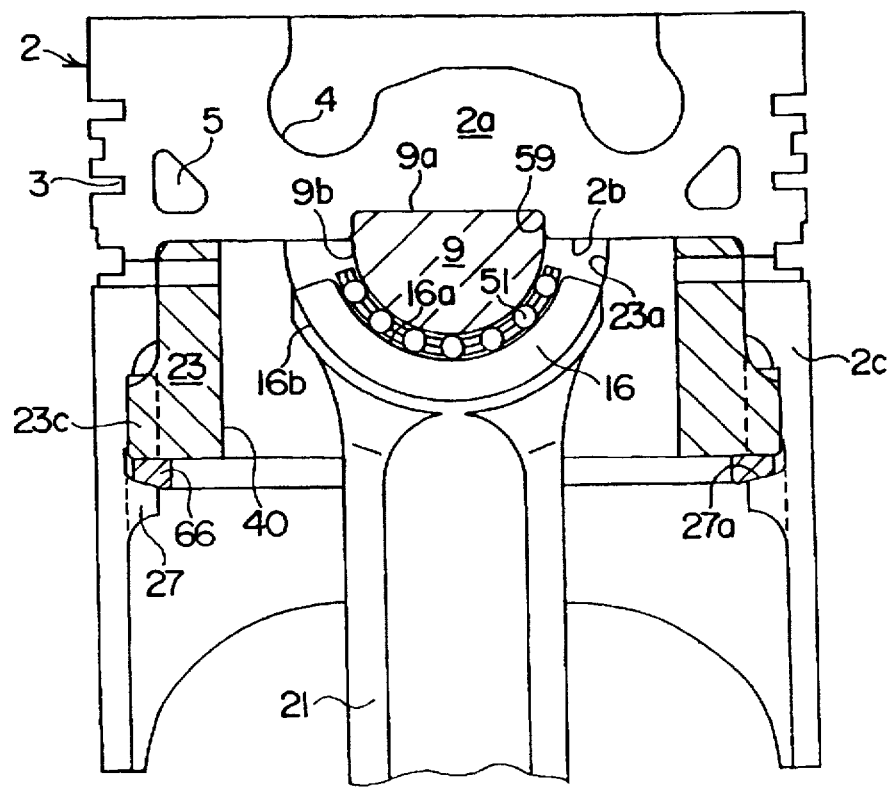
FIG. 8 is a side sectional view showing the connecting structure of FIG. 7.

In the embodiments shown in FIGS. 7 and 8, the piston body 2 is molded by a well known salt core casting to provide a lower plate portion that closes the oil chamber 5. The annular member 23 supporting the arms 16 of the connecting rod 21 has an upper end surface engaging the lower surface 2b of the piston crown 2a, and a lower end surface thereof is supported on an elastic ring 66 positioned on the upper surface 27a of the projection 27 of the skirt portion 2c. Formed in the piston crown 2a are oil holes 58a extending between the cooling oil chamber 5 and the depressions 52 of the annular member 23. An angular groove 59 for positioning and obstructing movement the oscillation guide member 9 is provided on the lower surface 2b of the piston crown 2a. Between the oscillation guide member 9 and the connecting rod 21 is disposed a well known roller bearing 51 with a lateral retainer. The guide member 9 is engaged with the angular groove 59 of the piston crown 2a prior to insertion of the connecting rod 21 and annular member 23 into the piston body 2. Subsequently, the elastic ring 66 which is capable of enlargement is engaged between the projection 23c of the annular cavity 23 and the projection 27 of the skirt portion 2c. One or both surfaces of the elastic ring 66 have a conical form.

According to the present embodiment, since the thrust load acting on the piston body 2 is borne by the angular groove 59 of the piston crown 2a and the opposite wall surfaces of the guide member 9, the load burden on the sliding portion of the arms 16 of the connecting rod 21 is relieved. That is, the rotational moment acting on the piston body 2 is small, and the impinging load of the skirt portion 2c with respect to the cylinder is reduced to both suppress knocking and abrasion of the projections 27 which support the annular member 23 on the skirt portion 2c.

In the embodiments shown in FIGS. 9 to 13, a roller bearing 51 with a transverse retainer is again disposed between the guide member 9 and the arms 16 of the connecting rod 21, and the upper surface 9a of the guide member 9 and the upper end surface of the annular member 23 again engage the lower surface 2b of the piston crown 2a. Also, lower end surface of the annular member 23 is again supported on the upper surface 27a of the projection 27 of the skirt portion 2c. Extending through the skirt portion 2c and the annular member 23 is a stop pin 54 which obstructs rotation of the piston body 2 with respect to the skirt portion 2c.

Figure 4:
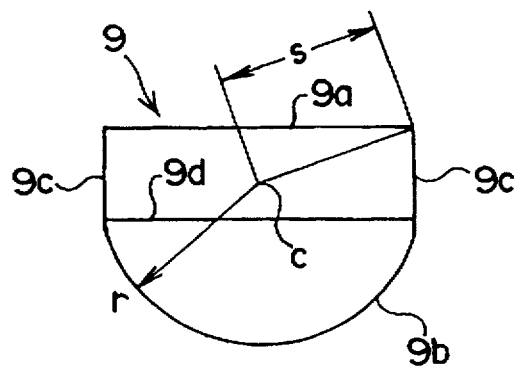
FIG. 4 is a side view showing an oscillation guide member in the connecting structure of FIG. 1.
Figure 9:
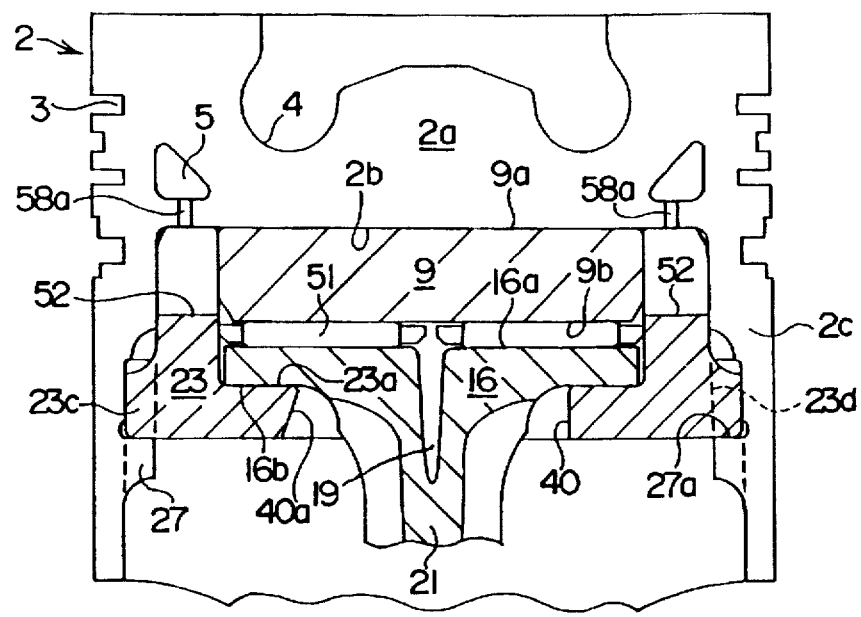
FIG. 9 is a front sectional view of a connecting structure between a piston and a connecting rod according to a fourth embodiment of the present invention.
Figure 10:
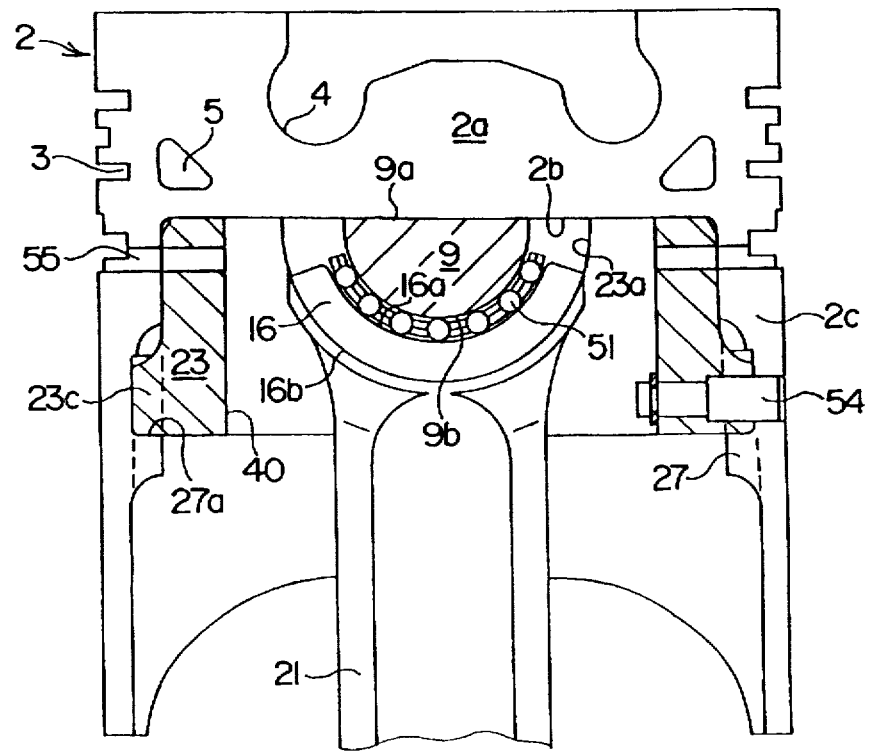
FIG. 10 is a side sectional view showing the connecting structure of FIG. 9.

As shown in FIG. 9, oil is forcibly supplied from the internal oil passage 19 in the connecting rod 21 to the roller bearing 51, similarly to the embodiments of FIGS. 2–4. Lubricating oil from the cooling oil chamber 5 of the piston crown 2a is supplied to the roller bearing 51 through the oil holes 58a and the left and right depressions 52 which are provided in the upper end surface of the annular member 23. For this purpose, an intersecting portion of the lower surface 9b of the guide member 9 is cut obliquely.

Figure 11:
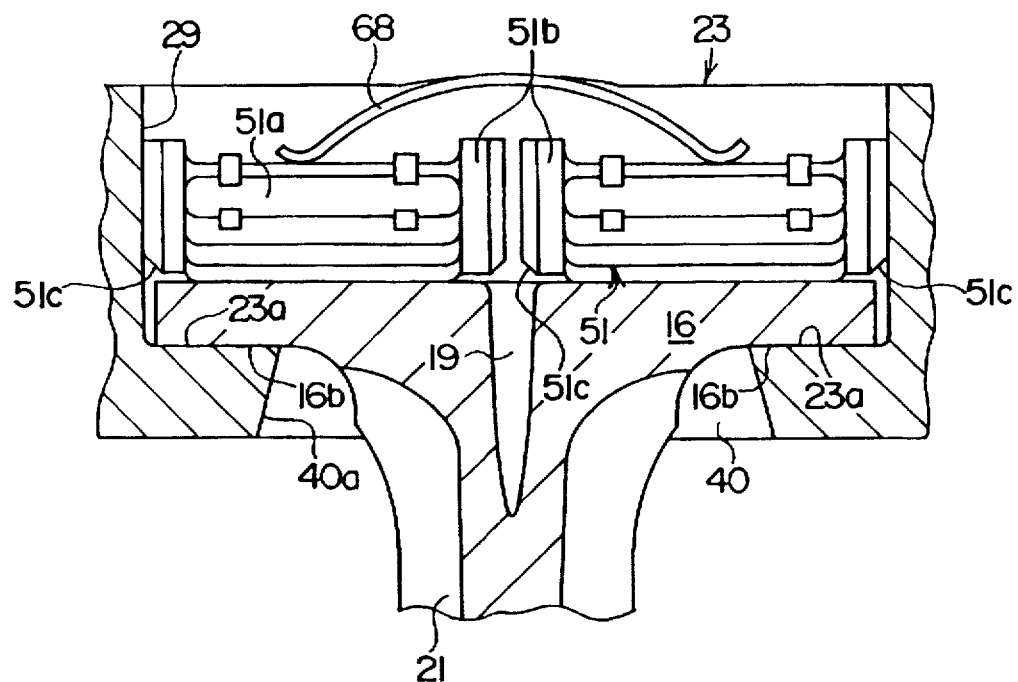
FIG. 11 is a front sectional view showing main parts of the connecting structure in an enlarged scale.

As shown in FIG. 11, a roller bearing 51 comprises a number of rollers 51a retained in rectangular openings which are aligned on the retaining plate 51b and curved arcwise. Since there is a difference in load exerted on the piston body 2 by forward oscillation of the connecting rod 21 and rearward oscillation of the connecting rod 21, the roller bearing 51 is raised rearwardly and the rollers 51a of the roller bearing 51 can sometimes slide on the upper surfaces 16a of the arms 16 of the connecting rod 21 without rolling therealong. To avoid this, an arcuate plate spring 68 is interposed between the front and rear ends of the retaining plate 51b of the roller bearing 51 and the piston crown 2a or another immovable member. During periods when the downward load from the piston body 2 to the arms 16 of the connecting rod 21 is small, the roller bearing 51 is returned to a neutral position by the force of the plate spring 68.

A difference between the diameter of each roller 51a of the roller bearing 51 and the thickness of the retaining plate 51b is 0.3 to 0.4 mm, and a clearance between the outer peripheral surface of the retaining plate 51b and the upper surfaces 16a of the arms 16 of the connecting rod 21 is 0.15 to 0.2 mm. Similarly, a clearance between the lower surface 9b of the guide member 9 and the inner peripheral surface of the retaining plate 51b is 0.15 to 02 mm. The internal oil passage 19 provided in the connecting rod 21 is opened to the outer peripheral surface of the retaining plate 51b. However, since the clearance between the lower or outer peripheral surfaces of the retaining plate 51b and the upper surfaces 16a of the arms 16 of the connecting rod 21 is small, lubricating oil flow is restricted to the outer peripheral surface of the retaining plate 51b and flow to the upper or inner peripheral surface of the retaining plate 51b. Accordingly, intersecting portions 51c at the opposite ends and the outer peripheral surface of the retaining plate 51b are obliquely cut to form an oil passage. A clearance between the pair of roller bearings 51 is established to be approximately 0.5 mm. An inclined surface or roundness is provided in the front and rear ends 16c of the upper surfaces 16a of the arms 16 so that the rollers 51a of the roller bearing 51 are not disengaged therefrom but are returned to the upper surfaces 16a, at the maximum oscillation of the connecting rod 21.

Figure 12:
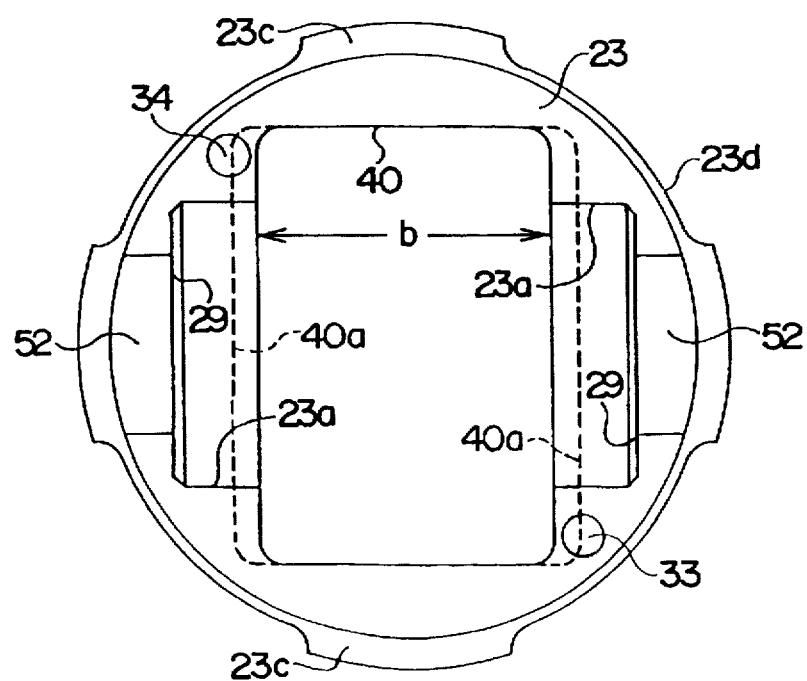
FIG. 12 is a plan view showing an annular cavity in the connecting structure of FIG. 9.
Figure 13:
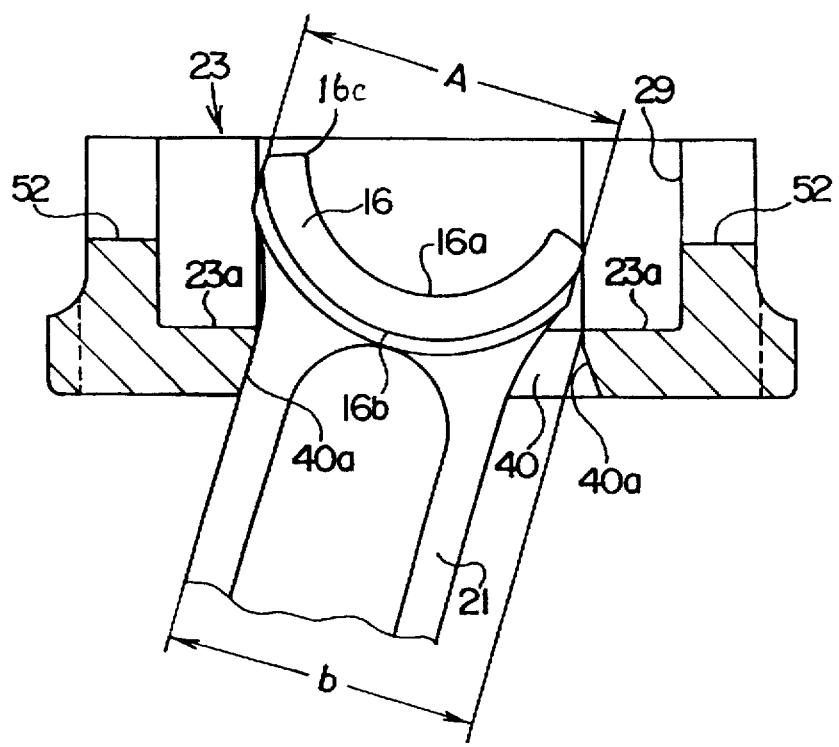
FIG. 13 is a front sectional view showing the step of assembling the connecting structure in an enlarged scale.

To lower surface pressure on the roller bearing 51 due to inertia load of the annular member 23, the width of the arm 16 is increased to lengthen a peripheral dimension of the upper surfaces 16a. However, as shown in FIGS. 12 and 13, the width A of the arm 16 is restricted by a lateral dimension b of the opening 40 of the annular cavity 23. Accordingly, one of left and right lower edges 40a of the opening 40 is downwardly expanded whereby the width A of the arm 16 can be made larger than the dimension b of the opening 40. As shown in FIG. 13, with the connecting rod 21 inclined with respect to the cylindrical depressed portions 23a of the annular member 23, it can be inserted into the opening 40 along the lower edges 40a formed on the lower side of the opening 40. Subsequently, the connecting rod 21 is rotated by 90° as described above to complete the assembly shown in FIG. 11.

According to the present embodiment, the roller bearing 51 is kept in a neutral position by the plate spring 68 to thereby fix the rolling surface for the roller bearing 51 with respect to the oscillation guide member 9. Thus, the area of the engaging portion between the arm 16 with the annular member 23 can be widened. This reduces the surface pressure on the engaging portion, without preventing insertion of the small end of the connecting rod 21 into the opening 40 of the annular member 23.

As described above, in the connecting structure between a piston and a connecting rod according to the present invention, the swing or oscillating center of the connecting rod with respect to the piston is considerably close to the piston crown, and if the arm of the crank shaft and the connecting rod are lengthened by that amount, the displacement of the cylinder is increased without changing the dimension of the cylinder block, the exhaust measures is facilitated, and an increase of output power of the engine becomes enabled.

The lower surface of semicircular oscillation guide member is placed in contact with the upper surfaces in the form of the cylindrical depressed portions of a pair of arms formed integral with the small end of the connecting rod, and the flat upper surface of the oscillation guide member is placed in contact with the lower surface of the piston crown. Therefore, the number of superposed surfaces participated in the clearance of the sliding portion of the small end of the connecting rod is less than that of prior art, the cumulated tolerance of parts is small, the machining expenses is reduced, and the productivity is enhanced.

Since the upper half portion of the oscillation guide member is engaged with the angular groove of the piston crown, a burden in the sliding portion of the arm of the connecting rod with respect to the load in the thrust direction (direction perpendicular to the crank shaft) exerting on the piston body is reduced.

The oil passage extending through the oscillation guide member is opened to the superposed surface between the oscillation guide member and the piston crown to thereby suppress a change of the clearance of the sliding portion of the small end of the connecting rod due to heat.

The angular opening for locating the oscillation guide member is provided in the top wall of the inner sleeve to thereby reduce the inertia mass for reciprocation of the piston, to reduce the frictional loss and to enhance the fuel consumption.

The top wall plate is sandwiched between the piston crown and the annular cavity to thereby achieve the closure of the cooling oil chamber, the positioning or locating of the oscillation guide member and the simplification of parts. Further, the thickness of the skirt portion is made thicker to enhance the rigidity.

Since the roller bearing between the oscillation guide member and the arm of the small end of the connecting rod is kept in a neutral position by the spring member, the rolling surface for the roller bearing with respect to the oscillation guide member is always retained.

Since the lower edge of the opening which is square in section for inserting the small end of the connecting rod is downwardly expanded, the area of the engaging portion between the arm of the small end of the connecting rod and the annular cavity can be increased to lower the surface pressure of the engaging portion.

Since the position of the projection of the skirt portion for supporting the annular cavity is made to be higher in level to make the center of the connecting rod, the piston assembly is considerably lightened, the reciprocating inertia mass is reduced, and fuel consumption is enhanced. Further, since the large notches can be provided in the left and right peripheral walls of the skirt portion, even if the stroke of the piston is made longer, the interference between the balance weight of the crank shaft and the skirt portion can be avoided.

Since the center of gravity of the piston assembly is made close to the oscillation center of the connecting rod, the length of the arm of rotational moment exerting on the piston is short, the piston is not rotated around the oscillation center of the connecting rod to impinge upon the cylinder, the slap sound is reduced, and the reliability and durability of the supporting portion for the annular cavity on the projection of the skirt portion are enhanced.

Obviously, many modifications and variations of the present invention are possible in light of the above teachings. It is to be understood, therefore, that the invention can be practiced otherwise than as specifically described.

What is claimed is:

1. Internal combustion engine apparatus comprising:

piston having a crown portion with a piston bottom surface, and a skirt projecting therefrom and defining a cavity;

a connecting rod having at one end a semicylindrical yoke portion having an upwardly directed semicylindrical concave surface and downwardly directed semicylindrical convex surfaces;

a guide member slidably retained between said bottom surface and said concave surface; and an annular member projecting into and fixed to said skirt, said annular member defining spaced apart semicylindrical surfaces engaging portions of said convex surfaces.

2. Apparatus according to claim 1 wherein said guide member has a planar upper surface engaging said piston bottom surface and a semicylindrical bottom surface engaging said concave surface.

3. Apparatus according to claim 2 wherein said guide member comprises an upper portion defining said planar upper surface and being rectangular in cross-section, and a lower portion defining said semicylindrical surface and being semicircular in cross-section.

4. Apparatus according to claim 3 wherein said bottom surface defines an annular oil chamber; and including a plate means engaged between said bottom surface and said annular member, said plate means covering said oil chamber and defining an oil supply orifice communicating with said oil chamber.

5. Apparatus according to claim 4 wherein said plate means further defines a central opening through which said upper portion of said guide member projects.

6. Apparatus according to claim 5 including a cup shaped sleeve having a bottom wall forming said plate means and a sidewall engaged between said skirt and said annular member.

7. Apparatus according to claim 3 wherein said bottom surface defines a central recess receiving said upper portion of said guide member.

8. Apparatus according to claim 7 wherein said bottom surface defines an annular oil chamber; and including a plate means engaged between said bottom surface and said annular member, said plate means covering said oil chamber and defining an oil supply orifice communicating with said oil chamber.

9. Apparatus according to claim 1 including a roller bearing means disposed between said semicylindrical bottom surface of said guide member and said concave surfaces, and a retainer restricting movement of said roller bearing means in an axial direction.

10. Apparatus according to claim 9 wherein said guide member has a planar upper surface engaging said piston bottom surface and a semicylindrical bottom surface engaging said concave surface.

11. Apparatus according to claim 10 wherein said guide member comprises an upper portion defining said planar upper surface and being rectangular in cross-section, and a lower portion defining said semicylindrical surface and being semicircular in cross-section.

12. Apparatus according to claim 11 wherein said bottom surface defines an annular oil chamber; and including a plate means engaged between said bottom surface and said annular member, said plate means covering said oil chamber and defining an oil supply orifice communicating with said oil chamber.

13. Apparatus according to claim 12 wherein said plate means further defines a central opening through which said upper portion of said guide member projects.

14. Apparatus according to claim 13 including a cup shaped sleeve having a bottom wall forming said plate means and a sidewall engaged between said skirt and said annular member.

15. Apparatus according to claim 11 wherein said bottom surface defines a central recess receiving said upper portion of said guide member.

16. Apparatus according to claim 15 wherein said bottom surface defines an annular oil chamber; and including a plate means engaged between said bottom surface and said annular member, said plate means covering said oil chamber and defining an oil supply orifice communicating with said oil chamber.

17. Apparatus according to claim 1 wherein said skirt comprises an intermediate portion of given thickness and an outer end portion of substantially less thickness, and said intermediate portion defines notches for reducing the weight of said skirt so as to move the center of gravity of said piston near to the center of oscillation of said connecting rod.

18. Apparatus according to claim 17 wherein said guide member has a planar upper surface engaging said piston bottom surface and a semicylindrical bottom surface engaging said concave surface.

19. Apparatus according to claim 18 wherein said guide member comprises an upper portion defining said planar upper surface and being rectangular in cross-section, and a lower portion defining said semicylindrical surface and being semicircular in cross-section.

20. Apparatus according to claim 19 wherein said bottom surface defines an annular oil chamber; and including a plate means engaged between said bottom surface and said annular member, said plate means covering said oil chamber and defining an oil supply orifice communicating with said oil chamber.

* * * * *

UNITED STATES PATENT AND TRADEMARK OFFICE
CERTIFICATE OF CORRECTION

PATENT NO. : 5,794,582
DATED : August 18, 1998
INVENTOR(S) : Horiuchi

It is certified that error appears in the above-identified patent and that said Letters Patent is hereby corrected as shown below:

Title page,
Please insert the following:

FOREIGN APPLICATION PRIORITY DATA
Sept. 26, 1995  [JP]   Japan   7-271,743

Signed and Sealed this

Eighteenth Day of September, 2001

Attest:

NICHOLAS P. GODICI
Attesting Officer      Acting Director of the United States Patent and Trademark Office